United States Patent [19]
Heintzmann et al.

[11] Patent Number: 4,576,524
[45] Date of Patent: Mar. 18, 1986

[54] ROCK ANCHOR ARRANGEMENT

[75] Inventors: Peter Heintzmann, Bochum; Manfred Koppers, Duisburg; Karlheinz Bohnes; Gerhard Hecken, both of Bochum, all of Fed. Rep. of Germany

[73] Assignee: Bochumer Eisenhuette Heintzmann GmbH & Co. KG, Bochum, Fed. Rep. of Germany

[21] Appl. No.: 599,563

[22] Filed: Apr. 11, 1984

[30] Foreign Application Priority Data

Apr. 20, 1983 [DE] Fed. Rep. of Germany ... 8311672[U]

[51] Int. Cl.$^4$ .............................................. E21D 20/02
[52] U.S. Cl. .................................................. 405/260
[58] Field of Search ...................... 405/260, 261, 262; 52/230, 698, 704

[56] References Cited

U.S. PATENT DOCUMENTS

| 3,316,797 | 5/1967 | Williams | 405/260 X |
| 3,359,742 | 12/1967 | Blatter | 405/260 |
| 3,513,609 | 5/1970 | Lang | 52/230 |
| 4,069,677 | 1/1978 | Yamada et al. | 52/230 X |

FOREIGN PATENT DOCUMENTS

| 2328130 | 5/1977 | France | 405/260 |
| 2062794 | 5/1981 | United Kingdom | 405/260 |

Primary Examiner—Dennis L. Taylor
Attorney, Agent, or Firm—Michael J. Striker

[57] ABSTRACT

A rock anchoring arrangement for use in tunnel and mine constructions comprises an elongated anchoring rod insertable in a bore formed in a rock formation, and a supporting plate arranged in contact with the rock formation at the open end of the bore. The anchoring rod includes a leading end portion fixable at the bottom of the bore, a trailing end portion fixable at the open end of the bore, and a smooth intermediate portion of a cross-sectional area smaller than those of the trailing end portion and the leading end portion. The anchoring rod is fixable by an adhesive within the bore at the leading end portion and at the trailing end portion whereas the intermediate portion is surrounded by an adhesive-repellent material to prevent the sticking thereof to the adhesive.

7 Claims, 3 Drawing Figures

ROCK ANCHOR ARRANGEMENT

BACKGROUND OF THE INVENTION

The present invention relates to an anchoring arrangement in general, and more particularly to a rock anchor for use in tunnels, mines or similar constructions, especially such which are subjected to considerable convergences.

Anchor rods have been known, provided with a circumferential projection or ridge which has been formed on the leading end of the anchor rod which has been inserted into a predrilled borehole. An adhesive has been used to fix the leading end of the anchor within the borehole. The end portion of the anchor rod, extended outwardly from the borehole is provided with the fastening thread, the latter extending centrally through a dish-like supporting plate which is supported against the face of a working. A nut screwed onto the fastening thread of the anchor rod presses the supporting plate circumferentially against the surface around the open end of the borehole.

If convergences in the rock exist all the forces exerted on the anchor rod act exclusively on the supporting plate. The result of these forces acting directly on the supporting plate is the occurrence of exfoliations in the rock strata in the region of the open end of the borehole. It has been suggested in practice to use the construction which is glued by adhesive in the borehole over the entire length thereof. However, in this instance forces occurring in the event of convergences in the rock strata are translated only to the supporting plate. In order to provide that the intermediate longitudinal portion of the anchor rod would also take up the rock strata forces anchor rods have been utilized, which have been provided over their entire length with circumferential projections. Concrete-reinforced steel has been usually used for the anchor rods. Such anchors have been fixed in the boreholes over their entire length with an adhesive. With such a construction, the movements of the rock strata have been transmitted onto the rock anchor immediately at the area of their formation and not only onto the supporting plate. It has been found that in the event of substantial convergences local overloads occur in the anchor rods, which lead to cracking of the rods at the locations of these overloads.

SUMMARY OF THE INVENTION

It is an object of the present invention to provide a rock anchor which is not possessed of the disadvantages of the conventional arrangements of this type.

It is another object of the present invention to provide an improved rock stabilizing anchor.

It is a further object of the present invention to provide a rock anchor with which exfoliations of the rock strata in the region of the open end of the borehole would be avoided on the one side, and on the other side with which the substantial movements of the rock strata would be distributed over a longer path whereby no cracks would occur in the anchor rod.

Still another object of the present invention is to so construct the rock anchor as to be simple in design, inexpensive in manufacture, easy to install, and reliable in use.

These and other objects of the present invention are attained by a rock anchor arrangement adapted to be inserted into and held by a body of hardenable adhesive in a bore provided in a rock structure, particularly in a rock formation of a tunnel or a mine construction, comprising an elongated anchoring rod including a leading end elongated portion and a trailing end elongated portion as considered in the direction of insertion of the anchoring rod into the bore, said leading end portion having at least one circumferential projection at its outer circumference; and a supporting plate arranged to contact the rock formation around the bore at an open end thereof, said trailing end portion having an end extended through said supporting plate and being displaceable relative to said plate, said anchoring rod further including an intermediate longitudinal portion extended between said leading end portion and said trailing end portion, said intermediate portion having a smooth outer surface and the length which is substantially greater than the length of said trailing end portion and said leading end portion, respectively, said leading end portion and said trailing end portion being adhesively secured within said bore by said hardenable adhesive, and said intermediate portion having on its surface an adhesive-repellent means, said intermediate portion being of a reduced cross-sectional area as compared to those of the trailing end portion and the leading end portion.

The rock anchor according to the invention has two relatively short longitudinal portions which are adhesively secured to the work facing of the rod. One of these short longitudinal portions is the leading end portion of the anchor and another of these portions is the trailing end portion which partially extends outwardly from the open end of the bore. Thereby, a reliable fixing of the rock anchor at the bottom of the bore is warranted first of all, and due to a further fixing of the anchor in the region of the open end of the bore the rock strata in this region will be held together and exfoliations will be prevented. The intermediate portion extended between the two above described relatively short portions is smooth and forms an extension space or reservoir which can be in the case of convergences in the rock extremely long. In order to avoid sticking of the intermediate portion with the adhesive this portion is surrounded with a special adhesive-repellent separating material. Any suitable materials can be utilized as a separating material which will warrant a relative displacement between the intermediate longitudinal portion of the anchor and the adhesive filling the bore. The provision of three functional regions of the rock anchor within the bore ensures the long lasting function of the rock anchor.

The intermediate portion may extend between said circumferential projection on said leading end portion and said trailing end portion. Although the projection on the circumferential surface of the leading end portion can be formed in any suitable fashion a roll forming is preferable and appears to be advantageous. This projection may be, for example a helically formed projection.

The ratio between the length of the intermediate portion and the length of the leading end portion may be about from 2:1 to 3:1. Such a ratio substantially improves the fixing effect of the anchor at the bottom of the bore and ensures holding of the rock strata together due to the considerably long extension of the smooth intermediate portion of the reduced cross-sectional area.

The trailing end portion may have an outer thread thereon. This outer thread can also serve as a component part of the anchoring rod, and at this thread the trailing end portion is fixed within the bore by adhesive because this threaded portion partially extends into the bore. The free end of the trailing end threaded portion extends outwardly from the bore and serves for fastening of the supporting plate thereto.

The above mentioned thread may be made by roll forming, which is advantageous.

The trailing end portion may be a sleeve partially surrounding said intermediate portion with a play. In this case the sleeve itself is adhesively secured within the bore. The smooth longitudinal intermediate portion then extends through the sleeve and is displaceable relative to the sleeve. The sleeve formed in the anchoring rod in this region can be also utilized as an extension space. In this embodiment the fastening of the supporting plate to the anchoring rod can be carried out by means of a nut which would be screwed on the end of the anchoring rod to press the supporting plate against the face of the rock formation.

The rock anchoring arrangement may further include a drawing sleeve mounted on the outer end of the trailing end portion so that the supporting plate would serve as a support for the drawing sleeve. The outer end of the trailing end portion extended beyond the supporting plate in the direction away from the bore may have a stepped portion of the enlarged diameter relative to the remaining part of the trailing end portion, and the drawing sleeve may surround that stepped portion. Thereby a so-called flexible anchor can be provided, in which the corbelled portion is drawn through the drawing sleeve so that the anchor can be utilized even with substantial convergences.

The ratio between the length of said intermediate portion and the length of said trailing end portion may be about from 4:1 to 5:1.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
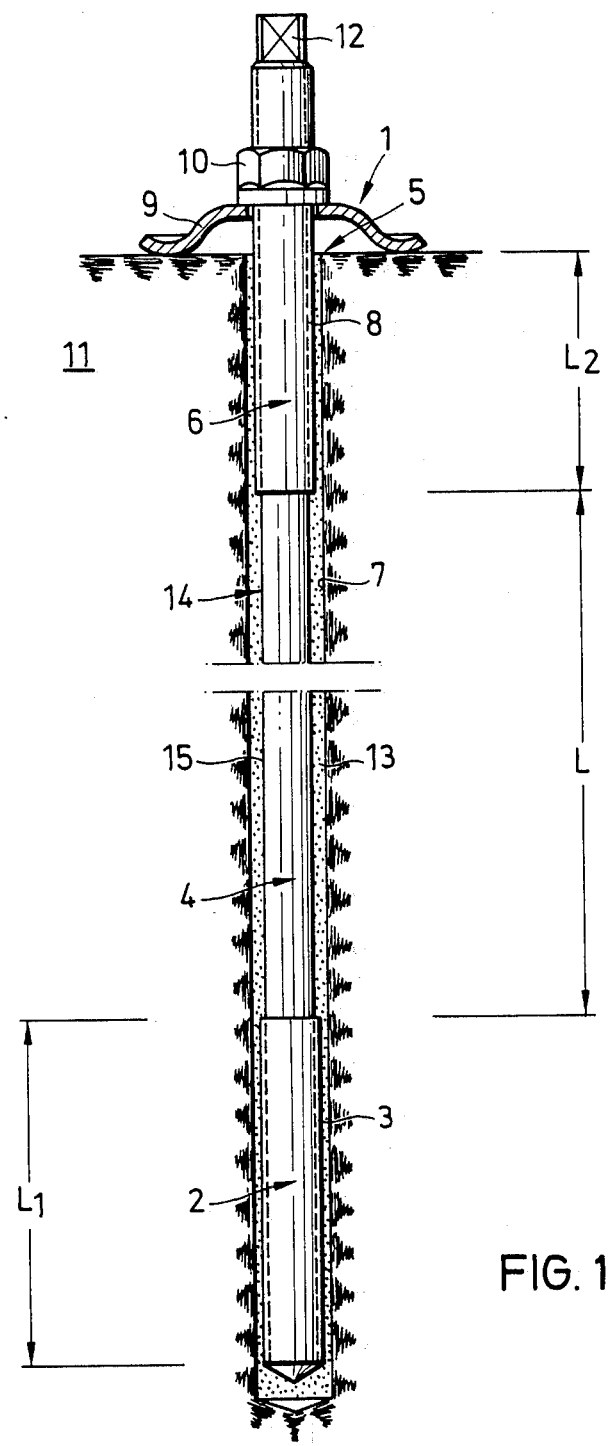
FIG. 1 is a longitudinal sectional view of an anchoring bore and of a rock anchor therein of the first embodiment of the invention.

Referring now to the drawings in detail, and first to FIG. 1 thereof, it may be seen that the reference numeral 1 designates a rock anchor which is comprised substantially of three longitudinal portions. A leading end longitudinal portion 2 is provided with circumferential projections 3 which are formed by roll forming. This leading end portion can also have one helical projection or ridge.

The leading end portion 2 merges into a smooth, ridgeless intermediate elongated portion of the length L, each is greater than the length L1 of the end portion 2. A trailing end portion 6 of the anchor is fixed at the open end of bore 7. The ratio between the length L of the smooth portion 4 and length L1 of the leading end portion 2 is about from 2:1 to 3:1. Smooth portion 4 has a reduced cross-sectional area as compared to the cross-sectional areas of portions 2 and 6 because no projections are formed on the surface of portion 4.

In the region of the open end 5 of the bore 7 provided in the working face 11, merges intermediate portion 4 into the threaded trailing end portion 6. The fastening thread on the longitudinal portion 6 is formed by roll forming. The ratio of length L2, over which the trailing end portion 6 extends into bore 7, to the length L of the smooth intermediate portion 4 is about from 1:4 to 1:5.

The threaded portion 6 extends outwardly from bore 7 and through an opening in a dish-like supporting plate 9 which is pressed against the rock surface 11 circumferentially about the open end 5 of bore 7.

At the end of the threaded portion 6 is formed a polygonal portion 12, with the aid of which the rock anchor 1 can be rotated in bore 7 in order to intermix with this anchor a multi-component adhesive 13 inserted into bore 7 after the drilling thereof in the form of a cartridge. Adhesive 13 surrounds rock anchor 1 and completely fills the bore 7 up. Thereby a homogeneous fixing of the leading end portion 2 and the trailing end portion 6 in rock 11 is provided by means of adhesive 13.

In order to prevent that the smooth stepless intermediate portion 4 of the rock anchor, which must adjust to convergences in the rock in the direction of elongation of the anchor, be clamped in the working face 11 by means of adhesive 13, this intermediate portion is provided on the circumferential surface thereof with a separating adhesive-repellent layer 15.

Figure 2:
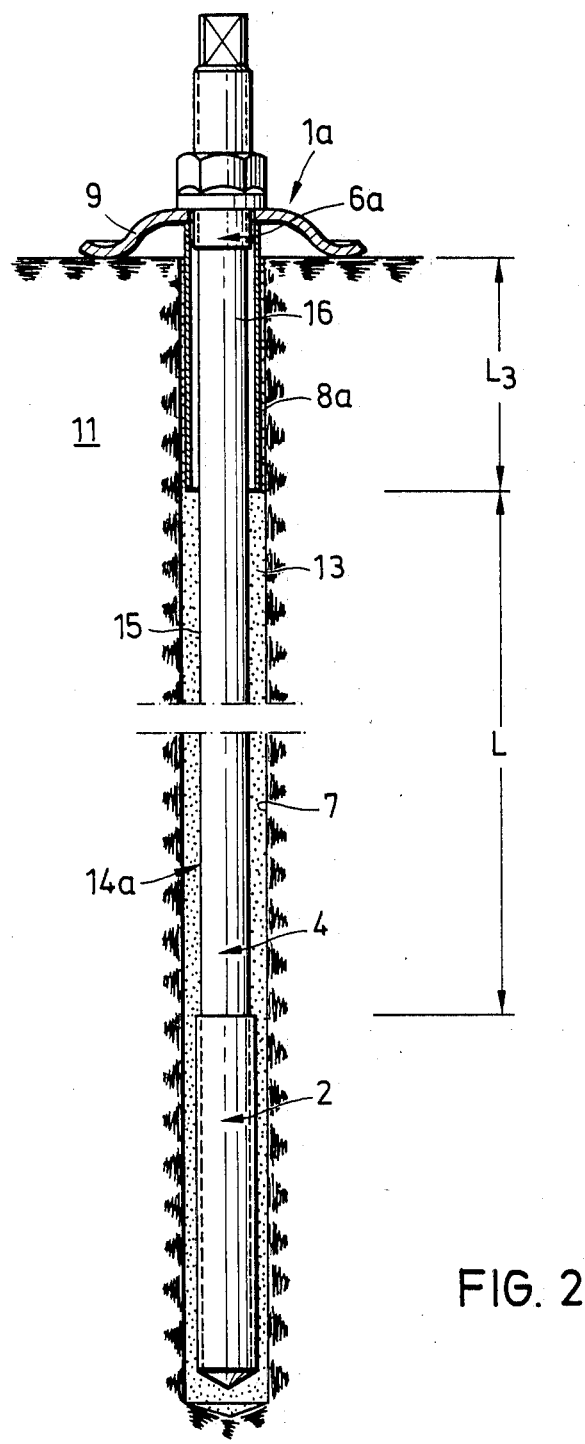
FIG. 2 is a longitudinal view of the rock anchor of another embodiment of the invention.

In the embodiment illustrated in FIG. 2 the rock anchor 1a basically corresponds to the rock anchor shown in FIG. 1. The distinction between these two embodiments resides in that the trailing end portion 8a of rock anchor 1a, which is fixed in the rock 11 by adhesive 13, has a thin wall sleeve which extends in bore 7 from plate 9 in the direction of the leading end portion 2. Sleeve 8a surrounds the upper part 16 of the smooth portion 14a with a play. Adhesive 13 is placed between the outer circumference of sleeve 8a and the wall of the bore.

The free outer end of the rock anchor 1a extended outwardly of bore 7 has also a threaded portion 6a with the fastening thread. The intermediate longitudinal portion of anchor rod 14a is thereby enlarged so that an extension reservoir in the case of convergences is enlarged by a distance corresponding to the length of an anchor portion 16 of the smooth intermediate portion 4, extending within sleeve 8a up to the threaded portion 6a.

The ratio of the length L3 of the portion of sleeve 8a extended within bore 7 to the length L of the smooth intermediate portion 4 is about from 1:4 to 1:5.

Figure 3:
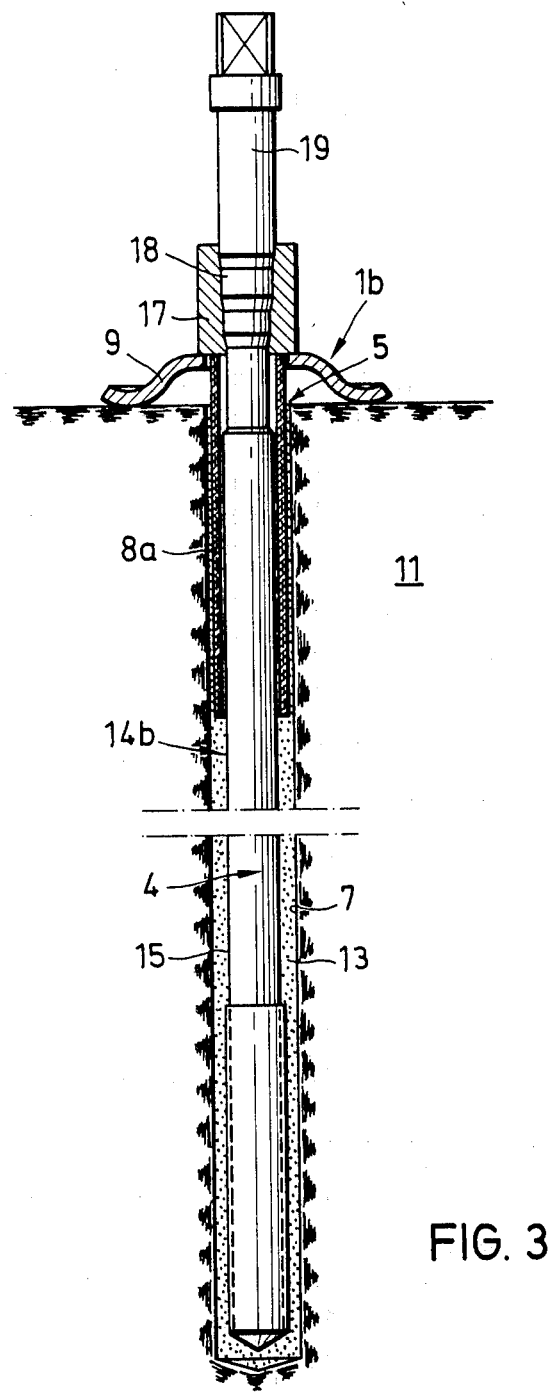
FIG. 3 is a longitudinal view of the rock anchor of yet another embodiment of the invention.

With reference to FIG. 3 it may be seen that in this embodiment of the present invention the supporting plate 9 serves the purpose of supporting a drawing sleeve 17 which surrounds a step-like portion 18 of enlarged diameter of an anchor rod 14 extended outwardly from the bore 7. Three steps are provided on the portion 18 of the anchor rod 14c. This drawing sleeve makes the anchor to some extent a slide anchor or flexible anchor in which movements of the rock strata are translated through the supporting plate 9 to the drawing sleeve 17 and the latter is displaced lengthwise of the free end 19 of the rock anchor 1b.

In the embodiment of FIG. 3 a sleeve 8a is also provided. Sleeve 8a extends from supporting plate 9 toward the intermediate smooth portion 4. The outer portion of sleeve 8a extends outwardly from bore 7. Sleeve 8a forms the trailing end portion of rock anchor 1b, which is fixed in the region of the open end 5 of bore 7 with working face 11 by adhesive 13. As clearly seen in FIG. 3 the sleeve 8a partially surrounds the intermediate smooth portion 4, namely its upper part 14c, with a play.

The smooth intermediate portion 4 of rock anchors 1a, 1b of FIGS. 2 and 3 is also provided with layer 15 on the surface thereof to separate the outer surface of smooth portion 4 from adhesive 13.

It will be understood that each of the elements described above, or two or more together, may also find useful application in other types of rock anchoring arrangements differing from the types described above.

While the invention has been illustrated and described as embodied in a rock anchoring arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rock anchor arrangement adapted to be inserted into and held by a body of hardenable adhesive in a bore provided in a rock structure, particularly in a rock formation of a tunnel or a mine construction, comprising an elongated anchoring rod including a leading end elongated portion and a trailing end elongated portion as considered in the direction of insertion of the anchoring rod into the bore, said leading end portion having at least one circumferential projection at its outer circumference; and a supporting plate arranged to contact the rock formation around the bore at an open end thereof, said trailing end portion having an end extended through said supporting plate and being displaceable relative to said plate, said anchoring rod further including an intermediate longitudinal portion extended between said leading end portion and said trailing end portion, said intermediate portion having a smooth outer surface and the length which is substantially greater than the length of said trailing end portion and said leading end portion, respectively, said leading end portion and said trailing end portion being adhesively secured with said bore by said hardenable adhesive, and said intermediate portion having on its surface and over the entire length thereof an adhesive repellent means whereby a relative displacement between said intermediate portion and said hardenable adhesive is possible, said intermediate portion being free of projections on the outer surface thereof and extending between said circumferential projection on said leading end portion and said trailing end portion, said trailing portion including a sleeve extending inwardly of the rock structure towards said leading end portion and partially surrounding said intermediate portion with a play so that said intermediate portion is guided in the sleeve and has a length additionally increased by a value corresponding to the length of said sleeve.

2. The arrangement as defined in claim 1, wherein said projection is made by roll forming.

3. The arrangement as defined in claim 1, wherein the ratio between the length of the intermediate portion and the length of the leading end portion is about from 2:1 to 3:1.

4. The arrangement as defined in claim 1, wherein said end of said trailing end portion has an outer thread thereon.

5. The arrangement as defined in claim 4, wherein said outer thread is made by roll forming.

6. The arrangement as defined in claim 1, wherein the ratio between the length of said intermediate portion and the length of said trailing end portion is about from 4:1 to 5:1.

7. The arrangement as defined in claim 1, further including a drawing sleeve mounted on said trailing end portion outside said supporting plate, said end of the trailing end portion having an enlarged diameter, said drawing sleeve surrounding said end outside said supporting plate.

* * * * *